United States Patent [19]

Ishika

[11] Patent Number: 5,132,959
[45] Date of Patent: Jul. 21, 1992

[54] OPTICAL HEAD IN USE WITH AN OPTICAL RECORDING/REPRODUCING APPARATUS

[75] Inventor: Sou Ishika, Kawasaki, Japan

[73] Assignee: Kabushiki Kaisha Toshiba, Kawasaki, Japan

[21] Appl. No.: 589,015

[22] Filed: Sep. 27, 1990

[30] Foreign Application Priority Data

| Sep. 29, 1989 | [JP] | Japan | 1-253959 |
| Sep. 29, 1989 | [JP] | Japan | 1-253966 |
| Sep. 29, 1989 | [JP] | Japan | 1-253969 |

[51] Int. Cl.⁵ .............................. G11B 7/00
[52] U.S. Cl. ................... 369/112; 369/110; 369/44.23; 369/121
[58] Field of Search ........... 369/110, 44.23, 112, 369/121

[56] References Cited

U.S. PATENT DOCUMENTS

| 4,599,714 | 7/1986 | Endo | 369/13 |
| 4,797,866 | 1/1989 | Yoshikawa | 369/110 |
| 4,797,868 | 1/1989 | Ando | 369/112 |
| 4,841,510 | 6/1989 | Yoshizawa | 369/58 |
| 4,965,785 | 10/1990 | Tadokoro et al. | 369/112 |
| 5,004,326 | 4/1991 | Sasaki | 369/110 |

FOREIGN PATENT DOCUMENTS

58-203646 11/1983 Japan.

Primary Examiner—Roy N. Envall, Jr.
Assistant Examiner—Nabil Hindi
Attorney, Agent, or Firm—Finnegan, Henderson, Farabow, Garrett and Dunner

[57] ABSTRACT

An optical head in use with an optomagnetic disk apparatus employs a polarized beam splitter when information is recorded on and read out from a recording medium. In the optical head according to the present invention, the polarization plane of the polarized beam splitter is arranged so that it makes an angle of substantially 45° with the polarization angle of the polarized laser beam entering the polarized beam splitter, whereby the optical head according to this invention does not use a ½ wavelength plate which is indispensable to the conventional optical head. In addition, the assembly and adjustment of the optical head according to the present invention are simplified.

10 Claims, 4 Drawing Sheets

OPTICAL HEAD IN USE WITH AN OPTICAL RECORDING/REPRODUCING APPARATUS

BACKGROUND OF THE INVENTION

1. Field of the Invention

The present invention relates to an optical head in use with an optical recording/reproducing apparatus, and more particularly to an optical head which is used in an optical filing system and the like and records information optically on a recording medium and reads out the recorded information therefrom.

2. Description of the Related Art

Such an optical filing apparatus is known as an optomagnetic disk apparatus in which information is recorded on an optical disk and reproduced and erased therefrom. In this apparatus, information is recorded and erased by a radiating laser beam on the recording surface of the optical disk and magnetizing the same. When only a laser beam is radiated on the optical disk on which information has been already recorded, the information is reproduced.

The recording erasure reproduction of information are performed by use of an optical head. This optical head is provided with a laser diode for generating a laser beam, and a beam splitter for irradiating the optical disk with the laser beam and guiding the laser beam reflected by the optical disk to an optical deflector.

In addition to these optical elements, the optical head is further provided with: an ellipse-correcting prism which shapes the cross section of a laser beam to be substantially circular and which causes the laser beam to have substantially the same intensity distribution between the horizontal and vertical directions of a cross section of the laser beam; a ½ wavelength plate which rotates the plane of polarization of the laser beam reflected by the optical disk; and a beam splitter which splits the laser beam whose plane of polarization has been rotated by the ½ wavelength plate, into a P-polarized light component and an S-polarized light component. It should be noted that the direction of polarization of a laser beam is parallel to a plane containing both the optical axis and the shorter axis of the cross section of an elliptic laser beam. This being so, the laser diode mentioned above is arranged to face the beam-incident surface of the ellipse-correcting prism, such that the direction of polarization of the laser beam can be either horizontal or vertical with respect to the beam-incident surface.

In the optical head, the laser diode generates a laser beam having an elliptic cross section, and the ellipse-correcting prism changes the cross section of the laser beam from elliptic to substantially circular or causes the laser beam to have a substantially the same intensity distribution between the horizontal and vertical directions of a cross section of the laser beam. Thereafter, the laser beam is focused on the information recording medium or the recording surface of the optical disk after passing through a polarized beam splitter and an objective lens and then reflected by the recording surface of the optical disk to the polarized beam splitter through the objective lens. The reflected laser beam is separated from the laser beams traveling to the optical disk and divided into a focus-and-track detecting laser beam and an information-reproducing laser beam.

The focus-and-track detecting laser beam is converted into focus control signals and track control signals and supplied to a lens moving mechanism for defining the position of the objective lens so as to accurately trace data recorded on the optical disk.

The polarization plane of the information-reproducing laser beam is rotated through 45° by an ½ wavelength plate, and then, the rotated laser beam are lead to the polarized beam splitter to be divided into P-polarized light component passing through the beam splitter and S-polarized light component reflected thereby. After detected by elements of respective optical detectors, the P-component and the S-component are converted into electrical signals and reproduced as corresponding pieces of information recorded on the optical disk. The ½ wavelength plate is arranged such that the amount of P-component and that of S-component of a laser beam are equal to each other in the case where the optical disk has not yet been used or magnetized. In other words, the plane of polarization of the laser beam reflected by the optical disk is rotated approximately 45° with reference to the beam-incident surface of the ellipse-correcting prism.

When information is recorded on the optical disk, the recording surface of the optical disk is initialized. By this initialization, the recording surface is magnetized in the same direction. At this time, the direction of polarization of the laser beam reflected by the optical disk is shifted such that the P-component becomes larger than that of S-component. This condition is similar to that of the case where data "0" is recorded. On the other hand, in the case where data "1" is recorded, the recording surface is magnetized in the opposite direction, and the direction of polarization of the laser beam reflected by the optical disk is shifted such that the S-component becomes larger than that of P-component. In this manner, the difference between the P-component and the S-component is detected and is reproduced as information recorded on the optical disk.

The intensity of the laser beam is modulated in response to information at the time of recording. At the same time when the laser beam is incident on the optical disk, a magnetic field is generated by a magnet arranged so as to face the optical head. Pits are formed on the optical disk by changing the directions of magnetization in the areas where the laser beam is irradiated such that information corresponding to the laser beam which is modulated in intensity is recorded on the optical disk. On the contrary, a laser beam having a predetermined intensity larger than that of information which has already recorded on the optical disk are projected thereon to erase the information. Since, in this case, a magnetic field is applied to the optical disk as is in the case of recording, the direction of the magnetization in the area illuminated with the laser beam is returned to the original state. At the reproduction of information, a laser beam is used which has a predetermined intensity smaller than that of the laser beam which is used for erasing the information. In this stage, when information is not recorded or no pits exit on the projected area, no rotation occurs in the polarization plane of the laser beam reflected by the optical disk. Whereas, when any information or any pit exists on the optical disk, the polarization plane of the reflected laser beam is rotated. The rotation of the polarization plane is detected by the above-mentioned detecting method and the information is reproduced.

In order to improve the reliability of a reproduced signal, it is desired that the optical head be provided with not only the ½ wavelength plate but also means for dividing the laser beam reflected by an unused or unmagnetized optical disk into P- and S-components substantially at the same ratio. Various additional mechanism such as for rotating the ½ wavelength plate about the optical axis of the laser beam. This structure creates the problem in which the number in optical parts of the optical head is increased, the optical head is rendered bulky and heavy and the durability of the optical head is deteriorated. Further, since the optical characteristics of the ½ wavelength plates themselves differ from plate to plate, assembly and adjustment of the optical head are made complicated, resulting in the increase of assembling cost.

SUMMARY OF THE INVENTION

An object of the present invention is to provide a compact optical head.

Another object of the present invention is to provide an optical head which is easily assembled and adjusted.

A further object of the present invention is to provide an optical head which detects laser beams stably.

The present invention provides an optical head for use with an apparatus for recording information on a recording medium, comprising means for generating polarized light rays having a central axis and a polarization plane making a predetermined angle with a perpendicular axis making right angles with the central axis, first separating means for passing the light rays from the generating means to a recording medium with a reflecting surface and for separating light beam reflected by the reflecting surface from the light rays, and second separating means, arranged in a plane in which the first separating means is disposed, for further separating the reflected light beam.

The laser diode is arranged in a rotated state beforehand, so that the plane of polarization of the laser beam is rotated substantially 45° around the optical axis with reference to the plane of polarization of the polarized beam splitter. Aecordingly, the ½ wavelength plate can also be omitted. Moreover, the polarized beam splitter can be arranged in parallel to the optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

The present invention will be fully described by way of embodiments with reference to accompanying drawings in which.

DETAILED DESCRIPTION OF THE PREFERRED EMBODIMENTS

The first embodiment of the optical head 2 in use with an optical disk apparatus will now be explained in detail with reference to FIGS. 1A and 1B.

Laser beam L generated by a laser diode 12 in response to the instruction of recording, erase and reproduction is rendered parallel by a collimator lens 14. The collimated laser beam L is reflected by a first non-polarized beam splitter 16 and focused on the recording surface 4a of an information recording medium or an optical disk 4 (hereinafter referred to only as the "optical disk 4") through an objective lens 18.

Laser beam l reflected by the recording surface 4a is rendered parallel again by the objective lens 18 and returned to the non-polarized beam splitter 16 so that the reflected laser beam l is separated by the splitter 16 from the laser beam L traveling from the laser diode 12 to the optical disk 4 and reflected thereby toward optical detectors 26, 28 and 30 as will be described later. The separated, reflected laser beam l is converged by means of a converging lens 20 and led to a second polarized beam splitter 22 to be divided into focus-and-track laser beam lf and information reading-out laser beam ld.

The laser beam lf is led to an optical element 26 through a TTP (twin tilt plate) 38 to perform focusing and tracking.

The laser beam ld is divided by a polarized beam splitter 24 into P-polarized light component ldp and S-polarized light component lds. Both polarized laser beams ldp and lds are conducted to optical detectors 28 and 30 by which the difference of signals between them is detected to utilize the reproduction of information is detected.

The optical disk 4 has a recording surface 4a which is made of amorphous magnetic metal or the like and in or on which coaxial or spiral groove-like or ridge-like tracks T are formed. Preliminary data such as addresses are previously formatted on each track T.

The laser beam L generated from the laser diode 12 has an elliptic cross section. It includes the direction of polarization E and which is rotated substantially 45° around an optical axis with reference to an Y axis included in the polarized beam splitter 24. It should be noted that the plane of polarization (plane of reflection) of the polarized beam splitter 24 is perpendicular to an X-Z plane. That is, the laser diode 12 is rotated with reference to a Y axis beforehand, in such a manner it generates a laser beam whose plane of polarization E, the direction of polarization, is rotated substantially 45° with reference to the plane of polarization of the polarized beam splitter 24.

The laser beam L is led through the non-polarized beam splitter 16 to the recording surface 4a and reflected thereby. The reflected laser beam l is supplied to the non-polarized beam splitter 22 through the non-polarized beam splitter 16. The laser beam ld separated from the laser beam lf by the beam splitter 2 are divided by the polarized beam splitter 24 into the P-polarized light component ldp and the S-polarized light component lds so that they are used for reproduction of information. In this case, for example, if the laser beam ld is reflected in a normal state, or if the laser beam ld is reflected from a non-magnetized area on the optical disk 4, the amounts of both divided laser beams ldp and lds must be substantially equal to each other.

The intensity of the laser beam L emitted from the laser diode 12 is adjusted by a laser driver, not shown, a beam modulating circuit or the like (not shown) depending upon the command for the record, erase and reproduction of information.

First, the laser beam L is modulated to have a predetermined intensity. At the same time, a magnetic field having a predetermined intensity is applied to the optical disk 4 by a magnet 36 positioned opposite to the optical head 2 such that the direction of the magnetization of the area illuminated with the laser beam L is changed to form a pit P. Thus, the information is recorded on the optical disk 4.

Secondly, the laser beam L which has a predetermined intensity larger than that of the laser beam L at the time of recording is generated by the laser diode 12. As is in the case of recording, a magnetic field is applied to the required area of the optical disk 4. whereby the direction of the magnetization in the area projected by the laser beam L is changed to the direction in which no information is recorded on this area of the optical disk 4. As a result, the information is erased.

Thirdly, the laser beam L which has a relative small predetermined intensity is produced by the laser diode 12. If there is no information in the area on which the laser beam L is incident, the polarization plane of the reflected laser beam is not be rotated. Whereas, if the information or a pit P is detected on the area, the polarization plane is turned. Therefore, the intensities of both laser beams ldp and lds detected by the respective two optical detectors 28 and 30 change according to the existence and absence of information. The intensities are converted into electrical signals and are compared to read out the information.

Generally, laser beam L generated by the laser diode 12 is linearly polarized in a direction and the laser rays thereof has an elliptic cross section. The laser rays, generated from the laser diode 12, has a short axis coinciding with the polarization direction. It is known that a polarized beam splitter passes the P-polarized light component of the laser beams L but reflects the S-polarized light component.

In the conventional optical head, as explained formerly, a polarized beam splitter similar to a polarized beam splitter 24 of the embodiment of the present invention is disposed to receive polarized laser beam. A ½ wavelength plate is arranged behind the beam splitter so as to divide P- and S-polarized light components so that they have substantially equal intensities.

On the other hand, a non-polarized beam splitter does not have a polarizing plane such as that of the polarized beam splitter mentioned above. Therefore, the P- and S-components pass through, or are reflected by the non-polarized beam splitter at substantially an equal intensity rate and with their phases maintained.

Figure 1A:
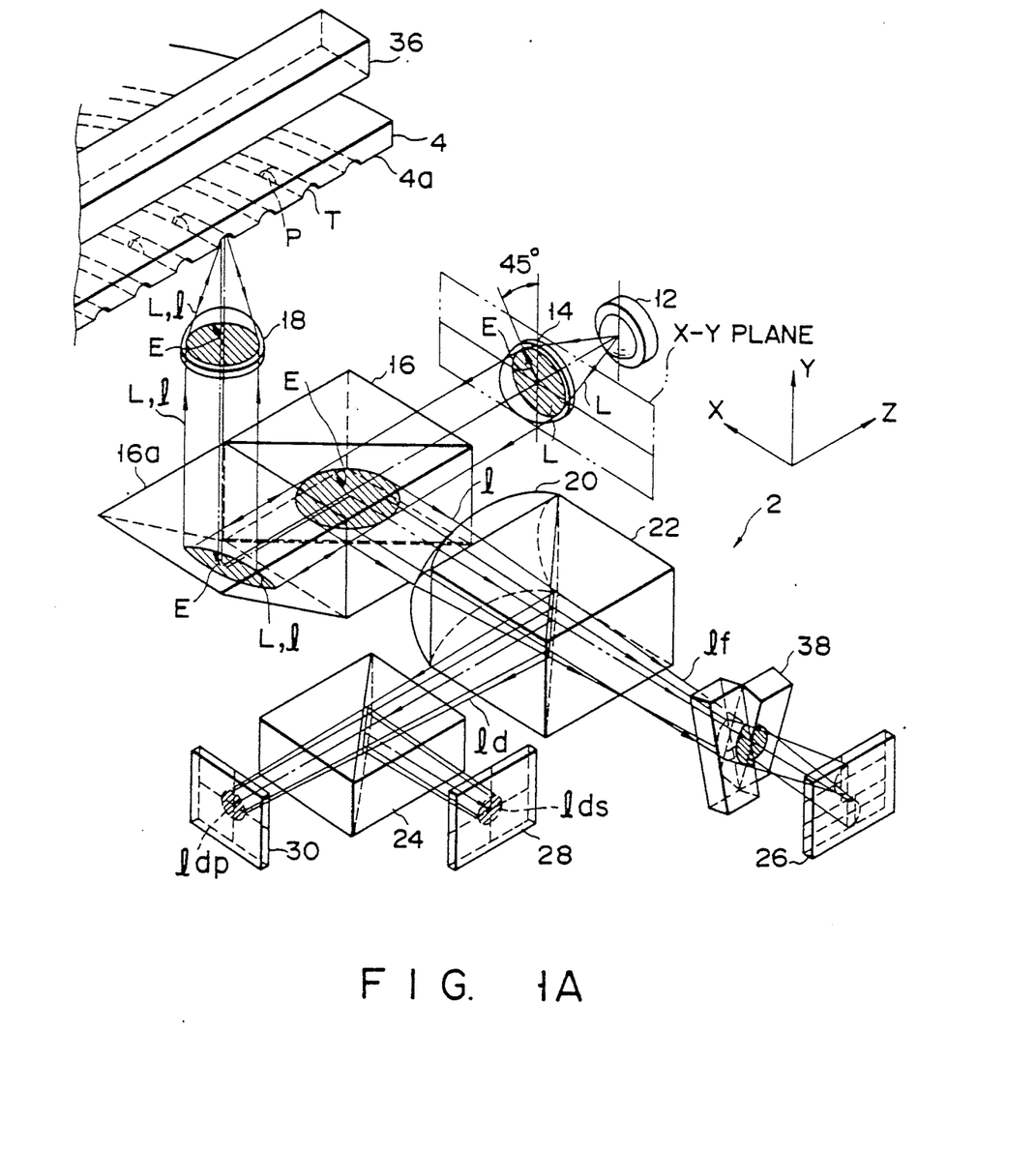
FIG. 1A is a schematic perspective view of a first embodiment of the optical head in use with the optomagnetic disk apparatus according to the present invention.
Figure 1B:
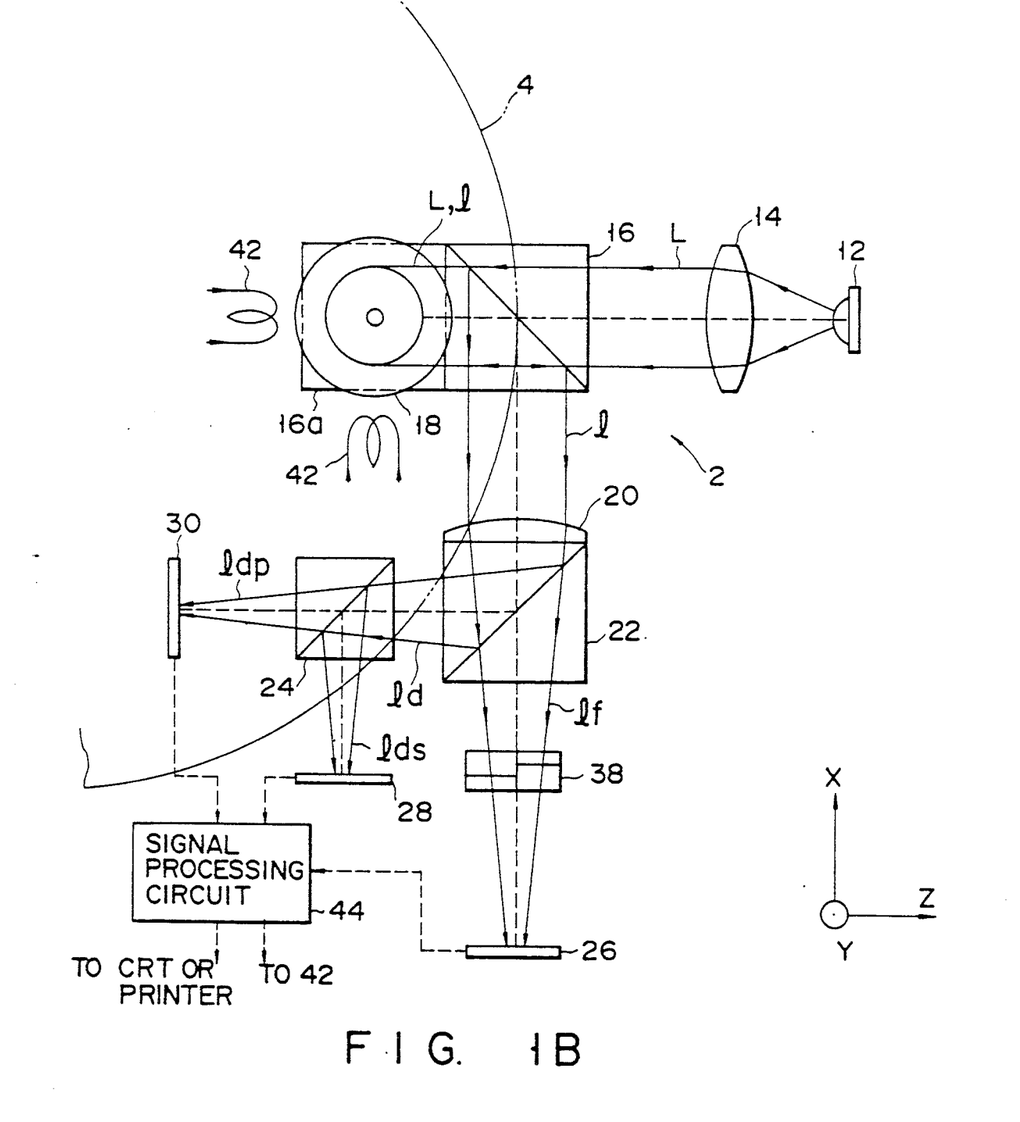
FIG. 1B is a top plan view of the optical head of FIG. 1A.

In the case where an unmagnetized optical disk is processed by the optical head shown in FIGS. 1A and 1B, the intensities of reflected laser beams ldp and lds detected by the two optical detectors 28 and 30 have to be equal to each other, as explained above. According to this embodiment, the first and second beam splitters 16 and 22 are non-polarized types. Further, since the direction of polarizing plane of the polarized beam splitter 24 is parallel to the Y axis, the laser diode 12 is arranged such that it is rotated substantially 45° around the optical axis with reference to the Y axis.

Consequently, the present invention has eliminated the need to employ the ½ wavelength plate, such as that which the prior art has to use for the purpose of dividing a polarized laser beam into P- and S-components at substantially an equal intensity rate. Naturally, therefore, the need to employ a mechanism for rotating such the ½ wavelength plate has also been eliminated. Further, since the apparatus of the present invention does not have to employ the ½ wavelength plate, it can be manufactured without such problems as are entailed by the use of the ½ wavelength plate. For example, the phase shift arising from the use of the ½ wavelength plate need not be considered in the manufacture of the apparatus of the present invention, and it is therefore not necessary to adjust the intensity difference between the P- and S-components of the laser beam.

The detailed description will now be made to the recording, erasing and reproduction of information.

Recording

The optical disk 4 is applied with a predetermined magnetic field by means of the magnet 36, and the laser beam L modulated in intensity is incident on the required area of the optical disk 4. Then, the corresponding track T of the recording surface 4a of the optical disk 4 is quickly heated to cause the direction of magnetization to be inverted, and the pit P having different reflectivity is formed on the track T, whereby information is recorded on the track T. In the state where information is not recorded on the optical disk 4, all portions of the track T remains magnetized in the same direction.

Erase

The optical disk 4 is applied with a predetermined magnetic field by means of the magnet 36, and a laser beam L having a predetermined intensity larger than that used for reproduction, is projected on the track T. The pit P formed on the track T is gradually heated and the direction of magnetization is again inverted so that the area where the pit P is formed has the same reflectivity as the area had before information was not recorded there.

Reproduction

The track T is illuminated with the laser beam L emitted from the laser diode 12 and having a predetermined intensity smaller than that at the time of erase. When no pit exists on the track T, no rotation of the polarization plane occurs to the laser beam l reflected by the optical disk 4, but, when there is a pit P on the track T, the polarization plane of the reflected laser beams l is rotated. The laser beam ld which is part of the laser beam l reflected by the beam splitter 22 is divided by the polarized beam splitter 24 into P-polarized light component ldp and S-polarized light component lds. If the P-component is detected as the difference between polarized laser beams ldp and lds, data "0", which represents the absence of a pit P, is read out of the optical disk 4. Conversely, if the S-component is detected as that difference, data "1", which represents the presence of a pit P, is read out the optical disk 4. The information is reproduced by a signal processing circuit 44 including an information reproducing circuit and the like and supplied to a CRT, a printer and/or the like.

The focus-and-track detecting laser beam lf passes through the second non-polarized beam splitter 22 to the optical detector 26 through the TTP 38 to be utilized to control the focusing and tracking of the laser beam L (directed from the laser diode 12 to the recording surface 4a) on the recording surface 4a. The focus-and-track detecting laser beam lf led to the optical detector 26 is converted into two electric signals, and these electric signals are supplied, through a focus-and-track control circuit (not shown), to a coil driving circuit (not shown) as a focusing error signal and a tracking error signal, respectively. In order to permit both the focusing error signal and tracking error signal to be "0" in level, the coil driving circuit (not shown) produces a coil driving signal to drive a voice coil 42. As a result, the objective lens 18 is moved to and fro along the optical axis in the plane containing the optical axis. In other words, the objective lens 18 is moved in parallel to the recording surface 4a of the optical disk 4. In this manner, the focusing and tracking mentioned above are maintained in the same state.

Figure 2:
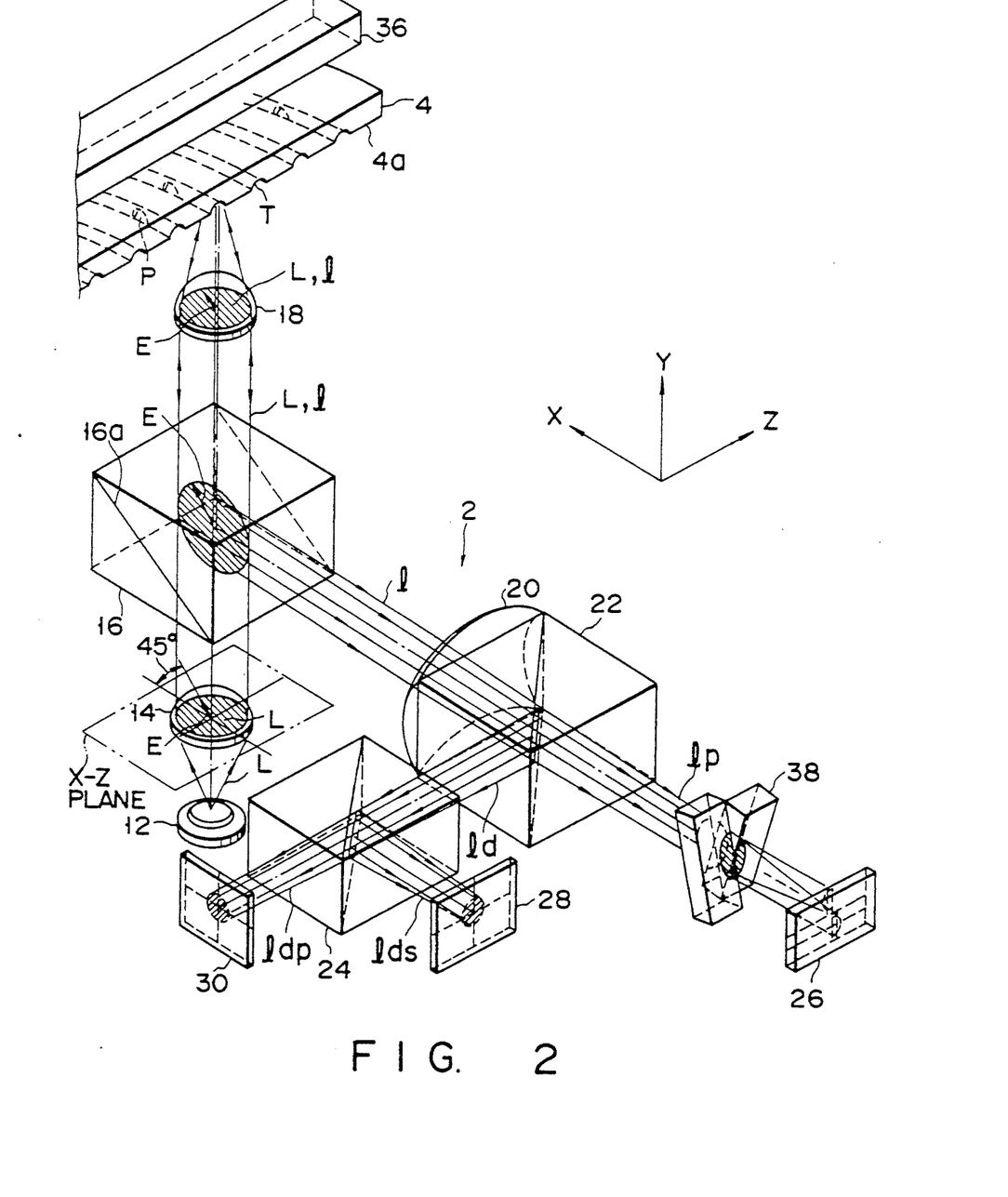
FIG. 2 is a schematic perspective view of a second embodiment of the optical head in use with the opto-magnetic disk apparatus according to the present invention.

FIG. 2 shows the second embodiment of the optical head 2 according to the present invention.

A first beam splitter 16 for separating laser beam 1 reflected by an optical disk 4 from laser beam L directed from a laser diode 12 to the optical disk 4 is formed integral with a non-polarizing reflecting mirror 16a, and a laser diode 12 and a collimator lens 14 are disposed in tandem to face the optical disk 4 so as to render the optical head 2 compact. The polarization plane of the laser beam L emitted from the laser diode 12 is rotated through substantially 45° with respect to the X-axis included in the polarized beam splitter 24. It should be noted that the polarized beam splitter 24 is perpendicular to an X-Z plane. That is, the laser diode 12 is rotated with reference to a X axis before hand, in such a manner it generates a laser beam whose plane of polarization E, the direction of polarization, is rotated substantially 45° with reference to the plane of polarization of the polarized beam splitter 24. A converging lens 20 for converging the laser beam 1 reflected by the optical disk 4 is formed integrally with a second non-polarized beam splitter 22.

The laser beam L generated by the laser diode 12 enters an objective lens 18 through the non-polarized beam splitter 16 and the reflecting mirror 16a is focused on a track T formed on the recording surface 4a of the optical disk 4. The pit P is formed on the track T by the laser beam L, whereby information is recorded on the track T. When the pit P is formed on the track T, the polarization plane of the reflected laser beam 1 is rotated and is returned to the objective lens 18.

The reflected laser beam 1 from the objective lens 18 is reflected by the first non-polarized beam splitter 16 and led to the second non-polarized beam splitter 22 integral with the converging lens 20. The reflected laser beam 1 is divided into focus-and-track detecting laser beam lf is led to a first optical detector 26 through a TTP 38, and the other laser beam ld is led to a polarized beam splitter 24. The laser beam ld is further divided by the polarized beam splitter 24 into P-polarized light component ldp and S-polarized light component lds. Both polarized laser beams ldp and lds are converted by the optical detectors 28 and 30 into electrical signals, respectively, to be utilized for reading out or reproducing information.

Figures 3A, 3B, 3C, 3D:
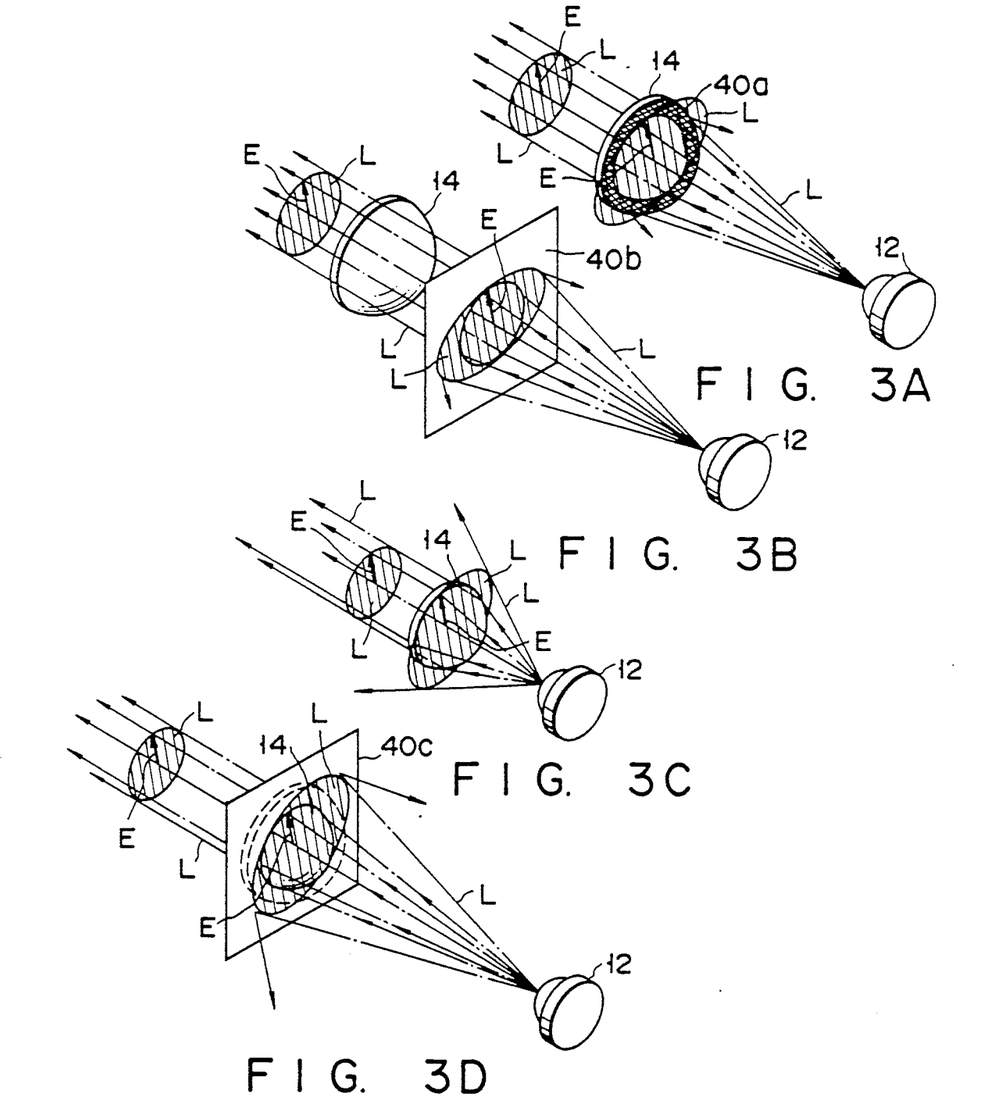
FIG. 3A is a perspective view of a mechanism for reforming the cross section of a bundle of laser beam emitted from a laser diode from an elliptic shape to a circular shape.
FIGS. 3B to 3D are modifications of the reforming mechanism of FIG. 3A.

As is shown in FIG. 3A, the collimator lens 14 is covered with a light shield layer or reflecting layer 40a having a ring shape. The laser beam L emitted from the laser diode 12 is reflected or shielded by this light shield layer 40a, such that it is shaped to have a circular cross section. The diameter of this circular cross section is substantially equal to an ellipse which is the cross section of the laser beam L emitted from the laser diode 12. In other words, the laser beam L which has passed through the collimator lens 14 has substantially the same intensity distribution between the horizontal and vertical directions of the circular cross section. As shown in FIG. 3B, a stop member 40b having an opening of a predetermined diameter is disposed between the collimator lens 14 and the laser diode 12 instead of the light shield layer or reflecting layer 40a of FIG. 3A. The laser beam L having an elliptic cross section when emitted from the laser diode 12 is restricted to form a circular cross section having the same diameter as the opening of the stop member 40b. As shown in FIG. 3D, a stop member 40c having a predetermined opening may be formed integral with the collimator 14. FIG. 3C shows a modification in which only a collimator lens 14 and a laser diode 12 are used. Since, therefore, the laser beam L is limited in shape in accordance with the diameter of the collimator lens 14. the laser beam L which has passed through the collimator lens 14 has substantially the same intensity distribution between the horizontal and vertical directions of the cross section, as in the embodiment shown in FIGS. 3A and 3B. The cut portion of the laser beam L is shielded by a lens supporting member, not shown, and, therefore, not will become spurious noise in the optical system of the optical head.

As explained above, the optical head according to the present invention uses non-polarized beam splitters for separating laser beam reflected by the optical disk from the laser beam directed from the laser diode toward the optical disk, with the polarization plane of the laser beam emitted from the laser diode rotated through substantially 45° with the Y-axis. This inventive structure does not require a ½ wavelength plate necessary for dividing laser beam into P-polarized light component and S-polarized light component at substantially an equal intensity rate, and a mechanism for rotating the ½ wavelength plate about the optical axis resulting in obtaining a compact optical head which is easily manufactured and the components thereof are easily adjusted.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical head for use with an apparatus for recording information on a recording medium with a reflecting surface, comprising:

means for generating polarized light rays having a central axis and a polarization plane perpendicular to the central axis and including a perpendicular axis, the polarization of said light rays making a predetermined angle with said perpendicular axis;

first separating means disposed in a plane parallel to the reflecting surface, having a non-polarized beam splitting plane, for passing the light rays from said light generating means to the reflecting surface, for separating a light beam reflected by the reflecting surface, and for guiding the reflected light beam parallel to the reflecting surface; and second separating means, disposed in the same plane as the first separating means, and having a polarization plane perpendicular to the central axis of the generated polarized light rays and polarized in one of a direction parallel to or perpendicular to the reflecting surface, said second separating means separating the reflected light beam into a plurality of separated light rays and transmitting the separated light rays in a plane parallel to the reflecting surface;

said first separating means being disposed between the second separating means and the recording medium for separating the reflected light beam from the light beam directed to the recording medium while maintaining the same angle of polarization and the same phase of the light beam.

2. The optical head according to claim 1, wherein the light generating means comprises means for generating the light beam at an angle of polarization which is rotated substantially 45° around the optical axis with reference to a plane of polarization of the second separating means.

3. The optical head according to claim 1, wherein the central axis extends in parallel with said reflecting surface.

4. The optical head according to claim 1, wherein said first separating means comprises a changing element integrally incorporated therein for changing a direction in which the light beam passes.

5. The optical head according to claim 4, wherein the changing element includes a non-polarizing mirror.

6. An optical head for use with an apparatus for recording information on a recording medium with a reflecting surface, comprising:

means for generating polarized light rays having a central axis and an elliptic cross section, and a polarization plane making a predetermined angle with a perpendicular axis making right angles with the central axis;

means for shaping the generated polarized light rays and permitting the light rays to have substantially the same intensity distribution between horizontal and vertical directions of a cross section of the light rays, said shaping means comprising a shield element for shielding an outer peripheral portion of the light rays;

first separating means disposed parallel to the reflecting surface, having a non-polarized beam splitting surface plane, for transmitting the light rays through said shaping means to the recording medium and for separating a light beam reflected by the reflecting surface, and for guiding the reflected light beam parallel to the reflecting surface;

second separating means, disposed in the same plane as said first separating means, for further separating the reflected light beam into a plurality of separated light rays and transmitting the separated light rays in a plane parallel to the reflecting surface, said second separating means having a plane of polarization which is perpendicular to the plane in which the second separating means is disposed.

7. The optical head according to claim 6, wherein the light shielding element shapes the polarized light rays such that the long axis of the polarized light rays is shortened to ½ or less.

8. The optical head according to claim 6, wherein the light shielding element is formed integral with said shaping means.

9. An optical head for use with an apparatus for recording information on a recording medium with a reflecting surface, comprising:

means for generating a polarized light beam which has an elliptic cross section and which includes a central axis and a plane of polarization that forms a predetermined angle with reference to an axis perpendicular to the central axis;

means for shaping the generated polarized light beam so that the light beam has substantially the same intensity distribution between horizontal and vertical directions of the cross section of the light beam;

first separating means, disposed in a plane parallel to the reflecting surface, including a non-polarized beam splitting plane, for allowing transmission of the light beam which has passed through the shaping means, for guiding the light beam to the recording medium, and for reflecting the light beam reflected by the recording medium parallel to the reflecting surface, thereby separating the light beam guided to the recording medium from the reflected light beam;

second separating means for further separating the reflected light beam from the first separating means into a plurality of separated light rays and transmitting the separated light rays in a plane parallel to the reflecting surface, said second separating means having a non-polarized beam splitting plane, and being disposed in the same plane as the first separating means;

first converting means for converting one of the reflected light beams separated by the second separating means into an electric signal;

third separating means for further separating another one of the reflected light beams separated by the second separating means, said third separating means being disposed in the same plane as the first and second separating means such that the central axis of the generated polarized light ray is maintained parallel to the reflecting surface, and having a plane of polarization perpendicular to the plane in which the third separating means is disposed;

and second converting means for individually converting two light beams, obtained as a result of the separation by the third separating means, into electric signals.

10. An optical head for use with an apparatus for recording information on a recording medium with a reflecting surface, comprising:

non-polarized separating means for separating a light ray which travels toward the reflecting surface and a reflected light ray which is reflected by the reflecting surface from each other, each of said light ray and said reflected light ray having a central axis and a polarization plane which is polarized in one direction within a plane perpendicular to said central axis, said non-polarized separating means causing said reflected light ray to travel parallel to the reflecting surface;

polarized separating means for separating said reflected light ray into a plurality of light beams, said polarized separating means having a polarization plane polarized in a direction which is parallel or perpendicular to the reflecting surface and which is in a plane perpendicular to the central axis of said reflected light ray travelling parallel to the reflecting surface, said polarized separating means performing separation by utilizing light-transmission through and light reflection by the polarization plane of said polarized separating means;

means for generating a polarized light ray having a polarization plane polarized in a direction which is 45° with respect to the direction in which the polarization plane of said polarized separating means is polarized;

means for separating one of said light beams into a plurality of beam components;

first converting means for converting another of said light beams into focus and track controlling signals; and second converting means for converting another of said beam components into an electrical signal so as to reproduce the information recorded on the recording medium.

* * * * *